United States Patent [19]

Zeitler

[11] Patent Number: 4,493,657
[45] Date of Patent: Jan. 15, 1985

[54] DEVICE FOR CONVERTING A CYCLE INTO A TREADLE-OPERATED WATER CYCLE

[76] Inventor: Ernst Zeitler, Linnestrasse 3, 8500 Nuernberg 70, Fed. Rep. of Germany

[21] Appl. No.: 400,018

[22] Filed: Jul. 20, 1982

[30] Foreign Application Priority Data

Jul. 23, 1981 [DE] Fed. Rep. of Germany ....... 3129051

[51] Int. Cl.³ ............................................. B63H 16/12
[52] U.S. Cl. ..................... 440/27; 114/283; 440/30; 440/12; 440/51
[58] Field of Search ............... 440/21, 26, 27, 28, 440/29, 30, 31, 32, 11, 12, 53, 51; 272/73, 70.3; 114/123, 283

[56] References Cited

U.S. PATENT DOCUMENTS

| | | | |
|---|---|---|---|
| 2,990,804 | 7/1961 | Garehime | 114/283 |
| 3,469,558 | 9/1969 | Puretic | 440/53 |
| 4,285,674 | 8/1981 | Chew | 440/26 |
| 4,322,070 | 3/1982 | Jordann | 272/73 |

FOREIGN PATENT DOCUMENTS

| | | | |
|---|---|---|---|
| 850964 | 12/1939 | France | 440/12 |
| 315906 | 3/1934 | Italy | 114/123 |
| 177743 | 4/1922 | United Kingdom | 440/12 |
| 426385 | 4/1935 | United Kingdom | 114/160 |
| 436336 | 10/1935 | United Kingdom | 114/283 |

Primary Examiner—Trygve M. Blix
Assistant Examiner—Edwin L. Swinehart
Attorney, Agent, or Firm—Brady, O'Boyle & Gates

[57] ABSTRACT

A conventional bicycle has its frame rigidly supported by a base framework held by adjustable length outrigger arms, whose outer ends are connected with bearings mounted on two spaced floats. The rear bicycle traction wheel frictionally engages and drives a propulsion wheel connected through gearing with a propeller. A tubular arm pivoted at its forward end to the base framework extends rearwardly beneath the bicycle traction wheel and supports the propulsion wheel, gearing and propeller. A pivoted rudder on the rear end of tubular arm is operated by cables extending through such arm and leading to the axle of the front steering wheel of the bicycle. The device possesses windsurfing and rowing capabilities.

3 Claims, 6 Drawing Figures

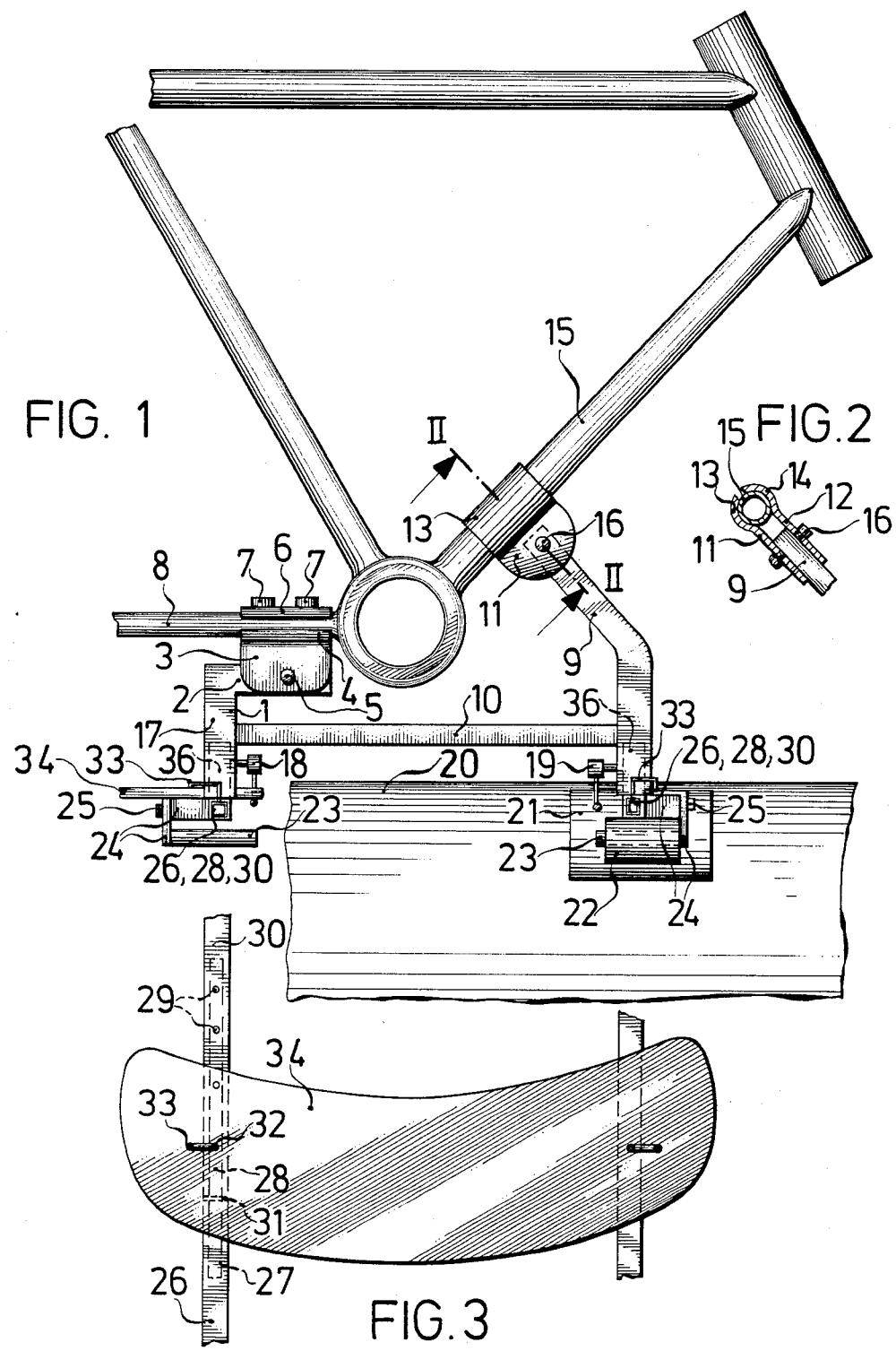

DEVICE FOR CONVERTING A CYCLE INTO A TREADLE-OPERATED WATER CYCLE

BACKGROUND OF THE INVENTION

The invention relates to a device for converting a cycle into a pedal-operated water cycle, which device can be attached quickly to any desired cycle, occupies little space, and can simultaneously be utilized for sailboarding and rowing.

The conventional pedal-operated water cycles are restricted to water, in the same manner as boats, and are unsuitable for transportation on land.

The invention is based on the object of providing a pedal-operated water cycle which can be driven to any desired location at the water by means of any type of cycle and, at that location, can be converted into a pedal-operated water cycle without great effort.

This object has been attained according to the invention by a base framework detachably connected to the cycle frame and to a spindle-shaped float on each side of the cycle; by a propeller pivotable in the vertical direction, driven by a friction wheel from the rear wheel of the cycle; and by a rudder controlled from the axle of the front wheel.

As for the individual parts of a device of this invention, the device is characterized, for example, by a base framework affixable to the cycle frame with clamping means pivotable in the wheel plane and with respectively one locking means on downwardly projecting pipe ends having an angular cross section.

In this arrangement, rods, with pins swivelable at right angles to the wheel plane provided at the ends, are utilized, fitting into corresponding bearings on the topside of the floats and exhibiting each an upwardly extending pin for insertion in the downwardly projecting ends of the base framework.

For driving purposes, a rod of oval cross section, supported at the rearward crossbar to be swingable in a vertical plane, is provided, this rod carrying at its free end a laterally oscillating rudder, a bevel gearing being attached to this rod. The friction wheel of this gearing is urged by a spring against the rear wheel tire. The bevel gearing drives a propeller via a shaft, control levers being mounted to the rudder on both sides, the ends of these levers being attached to pulley cables penetrating the rod of oval cross section and exiting from this rod to the outside at the bearing point of the rod. The pulley cables are hung into the hub ends of the front wheel by way of respectively one tension spring.

The ends of the rods coupling the cycle with the floats are telescopically extensible and can be locked in any desired position by U-shaped brackets serving simultaneously for the retaining of foot tread plates. The floats are most advantageously inflatable in a conventional fashion so that they can be stored at the cycle in a space-saving way.

BRIEF DESCRIPTION OF THE DRAWINGS

The drawings illustrate a device of this invention by way of example, to wit:

FIG. 1 shows the base framework according to this invention with a float, as seen from the side, to be mounted to a frame of any kind of cycle, which frame is shown herein only in its outlines.

FIG. 2 is a section along line II—II in FIG. 1 through the forward clamping means of the base framework.

FIG. 3 is a top view of a tread plate attached to telescopically extensible rods of the device.

DESCRIPTION OF THE PREFERRED EMBODIMENT

Figure 4:
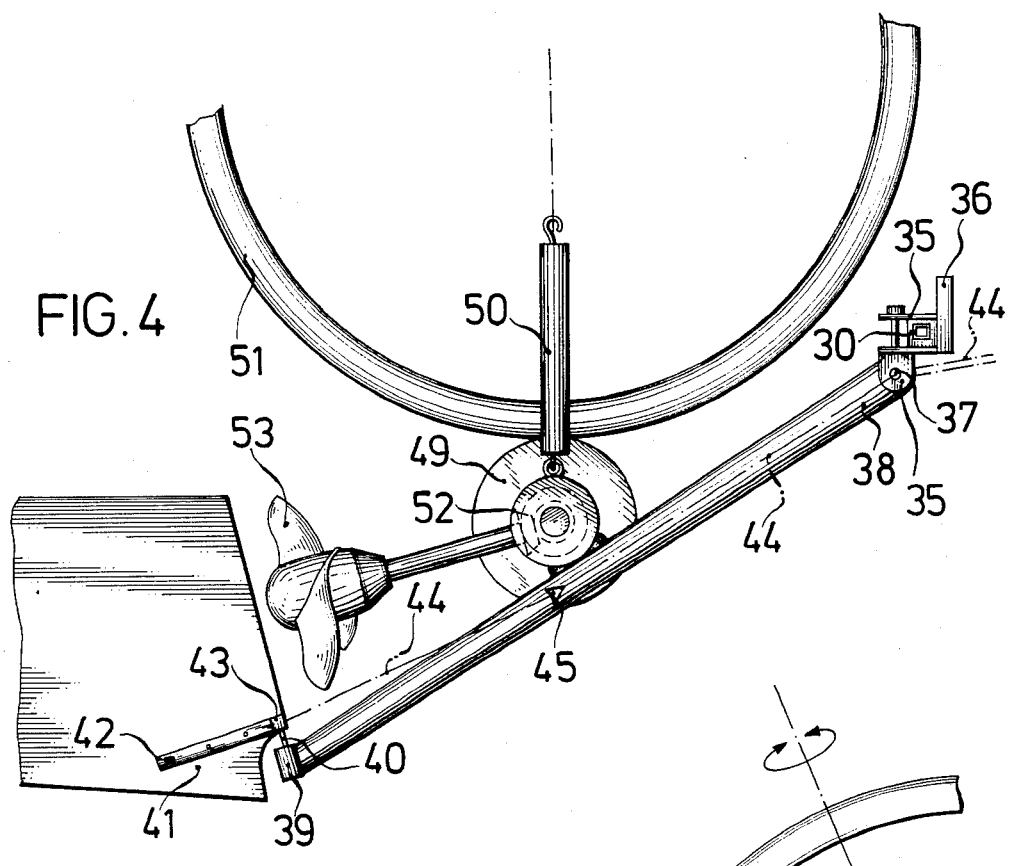
FIG. 4 shows the rear end of a cycle, with the drive mechanism for the treadle-operated water cycle, seen from the side.
Figure 5:
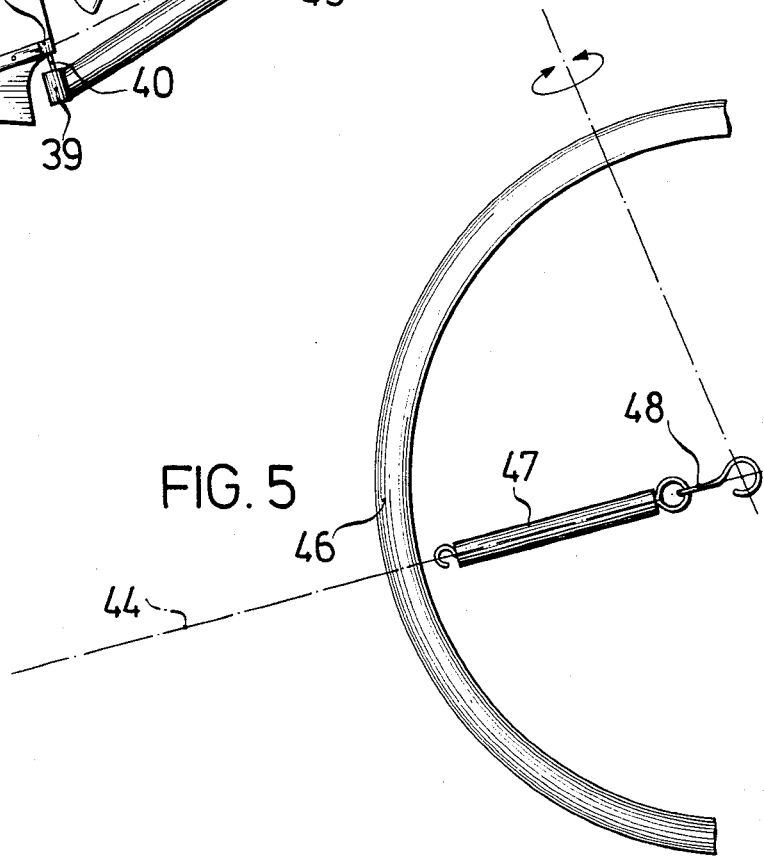
FIG. 5 shows the front wheel with the pulley cables and the operation of the rudder.
Figure 6:
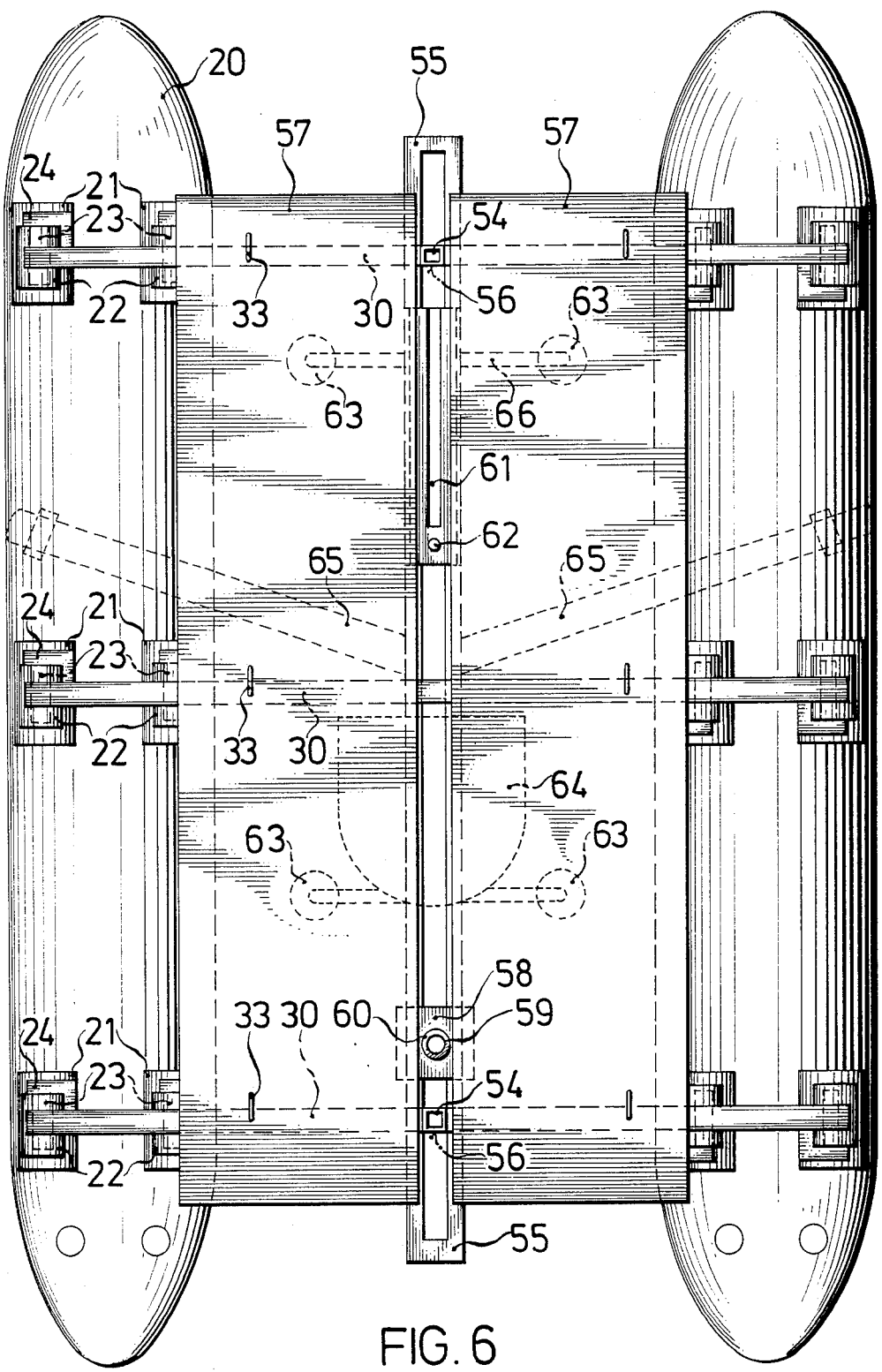
FIG. 6 shows three telescopable rods holding the two floats at the end and available for windsurfing or rowing.

The base framework of the invention comprises, in the illustrated example, an angle member 1 of square pipe material, the horizontal leg 2 of which is covered on the side by fish-plates 3 fixedly joined together by a plate 4, which latter projects laterally past the fishplates. The fishplates 3 and the plate 4 are pivotably connected to the horizontal leg 2 by means of a stud bolt 5. A second plate 6 is connected by two centrally arranged stud bolts 7 to the broad plate 4 and is capable of retaining the two legs 8 of the rear wheel fork of a cycle. The angle member 1 remains freely rotatable about the stud bolt 5.

Furthermore, the base framework comprises an only slightly angled square pipe 9 firmly joined to the angle member 1 by means of a rod 10. At the upper end of the square pipe 9, fishplates 11, 12 are arranged on the right and left thereof, carrying, at the upper end, just about semicircular channel members 13, 14 encompassing the forward pipe 15 of the cycle frame. A stud bolt 16 takes care of adapting the base framework without effort to any arbitrary configuration of the cycle. Capstan screws 18, 19 are provided at the downwardly extending leg 17 of the angle member 1 and at the downwardly extending end of the square pipe 9, these capstan screws effecting a rapid connection and release of the base framework to and from the float 20.

The inflatable floats 20 arranged to the left and to the right of the cycle exhibit in the top half thereof thick rubber washers 21 forming an integral part of a bearing 22 consisting of rubber. A pin 23 bearing at one of its ends a short swivel arm 24 fits into each of the bearings of a float 20. This swivel arm is rotatably joined to a square pipe 26 by means of a screw 25. A correspondingly shaped, thinner pipe 28 with a series of central bores 29 extending all the way through is inserted at the inner end 27 of this square pipe. A square pipe 30 fitting on this thinner square pipe 28 can be placed on the latter, this pipe 30 exhibiting a continuous bore 32 in the vicinity of the forward end 31, the long leg of a U-shaped bracket 33 fitting into this bore 32. The U-shaped bracket 33 has one long leg which extends through the bore 32, and the end of the leg is threaded and a star nut thereon holds it in place, and the bracket serves simultaneously for the holding of a tread plate 34 on each side of the cycle.

Furthermore, a clamp 35 is provided at the rearward square pipe 30 exhibiting, besides an upwardly projecting pin 36, bores 37 for accommodating a crossbar, which latter extends through the upper end of a pipe 38 of oval cross section and thereby effects free pivotability of the pipe 38. The lower end of the pipe 38 carries a bearing bushing 39 for the accommodation of a bearing pin 40 attached to the forward and lower end of a rudder 41. Furthermore, the rudder exhibits angle members 42 on both sides, the free leg 43 of such member projecting outwardly and being joined to respectively one cable 44. Both cables enter the oval pipe 38 at the openings 45 on opposite sides, and exit at the upper end of the pipe. From there, the cables 44 extend in the direction of the front wheel 46 and terminate in respectively one weak spring 47, the other end of this spring carrying a hook 48 for hanging to the free ends of the front wheel hub. As the front wheel is turned the cables 44 will cause a corresponding pivoting action or turning of the rudder 41.

A friction wheel 49, urged by a spring 50 against the rear wheel tire 51, serves for driving the pedal-operated water cycle. A bevel gearing assembly 52, has its housing welded to the oval pipe 38 at a suitable location, transmits the motion of the friction wheel 49 to a three-blade propeller 53.

The rear wheel tire 51 can be rotated via the normal drive sprocket wheel of the cycle by operating the pedals, or also by means of a drive motor conventionally attached to the cycle frame.

If the device of this invention is to be used selectively also for windsurfing or rowing, the square pipes 30 are rotated about their longitudinal axes by 180° so that their pins 36 point downwardly. They fit, in this upside-down position, into upwardly extending sleeves 54 of a narrow and elongated frame 55 and are firmly connected to the square pipe 30 with capstan screws 56. Long and wide plates 57 are utilized instead of the small tread plates 34 customary in the water-treading device. These plates 57, in turn, are attached just as the treadles by means of U-shaped hooks 33 with a nut at the end of the long leg to the square pipes 30. The frame 55 is encompassed by a U-shaped, wide bracket 58 with a pipe 59 and a nipple 60 attached thereto by screws, which nipple can be retained at any desired location of the frame. Furthermore, a centerboard casing 61 is additionally inserted in the free space of the frame 55; this casing can likewise be affixed at any location of the frame by means of a screw connection 62.

If the device of this invention is to be utilized for rowing purposes, it is merely necessary to remove the sailing mast and set up one of the commercially available rowing devices with four suction cups, the rubber bases 63 of which carry the seat 64, the outriggers 65, and the footrests 66. The central rod of the rowing device is held by rubber strings wrapped around the ends of the frame 55.

I claim:

1. A bicycle watercraft comprising a conventional bicycle having a frame and said frame including an inclined bar extending upwardly and forwardly from the pedal hub of the frame and a rear wheel fork extending horizontally rearwardly of the pedal hub, a base framework rigidly holding and bodily supporting the frame of the bicycle, said base framework comprising a forward frame bar having a lower vertical portion and an upper rearwardly inclined portion which is substantially perpendicular to said inclined bar of the bicycle frame, a two-part clamp pivotally attached to said inclined portion near the top thereof and clampingly embracing said inclined bar of the bicycle frame, said base framework further comprising a rear angle bar having a horizontal portion and a vertical portion depending from the horizontal portion, a connecting horizontal longitudinal bar extending between the vertical portion of said forward frame bar and the vertical portion of the rear angle bar and being rigidly joined with each, said forward frame bar, rear angle bar and connecting horizontal longitudinal bar being disposed in a common vertical plane with the bicycle frame, said connecting horizontal longitudinal bar lying beneath said pedal hub, a second two-part clamp pivotally attached to the horizontal portion of the rear angle bar and clampingly embracing said rear wheel fork of the bicycle frame, said first-named and second two-part clamps being pivotal on the base framework in said common vertical plane, horizontal transverse outrigger arms connected with the base framework and extending laterally outwardly from opposite sides thereof, a pair of laterally spaced floats secured to the outer end portions of the outrigger arms for buoyantly supporting the latter with said base framework and bicycle, and rider-operated propulsion and steering means for the bicycle watercraft including a propeller frictionally driven by the rear wheel of the bicycle.

2. A bicycle watercraft as defined in claim 1, and said rider-operated propulsion and steering means further including a tubular propulsion arm pivotally connected with the rear of said base framework and extending rearwardly thereof beneath the bicycle rear wheel, said propeller being fixed on said tubular propulsion arm intermediate the ends thereof and including a friction drive wheel in engagement with the bicycle rear wheel, a steering rudder pivotally mounted on the rear end of the tubular propulsion arm, and a pair of rudder control cables extending through at least a portion of the tubular propulsion arm and leading to the axle of the bicycle front wheel and being connected with such axle.

3. A bicycle watercraft as defined in claim 1, and at least the vertical portions of the base framework forward frame bar and rear angle bar being tubular and forming downwardly opening vertical sockets, and upstanding vertical rigid pin elements on said outrigger arms engaging within said sockets for connecting the outrigger arms with the base framework.

* * * * *